United States Patent
Driscoll et al.

(10) Patent No.: US 8,326,798 B1
(45) Date of Patent: Dec. 4, 2012

(54) FILE SYSTEM AGNOSTIC REPLICATION

(75) Inventors: Alan Stuart Driscoll, Fremont, CA (US); Peter Frank Corbett, Lexington, MA (US); Toby Smith, Pittsburgh, PA (US); Devang K. Shah, San Jose, CA (US); Srishylam Simharajan, Cranberry Township, PA (US); Keith Allen Arner, Cranberry Township, PA (US); Joe Warren Dukes, Jr., Pittsburgh, PA (US)

(73) Assignee: Network Appliance, Inc., Sunnyvale, CA (US)

( * ) Notice: Subject to any disclaimer, the term of this patent is extended or adjusted under 35 U.S.C. 154(b) by 315 days.

(21) Appl. No.: 12/559,340

(22) Filed: Sep. 14, 2009

(51) Int. Cl.
*G06F 7/00* (2006.01)
*G06F 17/00* (2006.01)

(52) U.S. Cl. ........................................ 707/610; 707/635
(58) Field of Classification Search .................. 707/610, 707/635
See application file for complete search history.

(56) References Cited

U.S. PATENT DOCUMENTS

| | | | |
|---|---|---|---|
| 2003/0182313 A1* | 9/2003 | Federwisch et al. | 707/200 |
| 2005/0195660 A1* | 9/2005 | Kavuri et al. | 365/189.05 |
| 2005/0226059 A1* | 10/2005 | Kavuri et al. | 365/189.05 |
| 2005/0229175 A1* | 10/2005 | McCrory et al. | 717/177 |
| 2006/0112151 A1* | 5/2006 | Manley et al. | 707/201 |
| 2007/0103984 A1* | 5/2007 | Kavuri et al. | 365/185.17 |
| 2007/0276885 A1* | 11/2007 | Valiyaparambil et al. | 707/204 |
| 2009/0083337 A1* | 3/2009 | Parees et al. | 707/201 |
| 2009/0327364 A1* | 12/2009 | Schwan et al. | 707/204 |

* cited by examiner

*Primary Examiner* — Shahid Al Alam
*Assistant Examiner* — Joshua Bullock
(74) *Attorney, Agent, or Firm* — Blakely, Sokoloff, Taylor & Zafman LLP

(57) ABSTRACT

A replication operation service migrates data from a source volume having a source file system type to a destination volume having a destination file system type, where the source file system type may be different from the destination file system type. The replication operation is completed without interrupting the operations of a client device in the system. A stable copy of the source file system is generated on the source volume. A file system agnostic representation of a portion of the data in the source volume is generated from the stable copy. The representation is transmitted to the destination volume where it is converted to conform to the destination file system type.

24 Claims, 7 Drawing Sheets

FILE SYSTEM AGNOSTIC REPLICATION

TECHNICAL FIELD

This invention relates to the field of network storage systems and, in particular, to file system agnostic replication of data in a storage system.

BACKGROUND

In modern computer networks, a storage server can be used for many different purposes, such as to provide multiple users with access to shared data or to back up mission critical data. A file server is an example of a storage server which operates on behalf of one or more clients to store and manage shared files in a set of mass storage devices, such as magnetic or optical storage based disks or tapes. The mass storage devices may be organized in units called volumes. A volume is a storage area having data organized in a file system. There can be many types of volumes, such as for example, flexible volumes, striped volumes, or traditional volumes, each implemented in a specific format to provide network attached storage (NAS) file services using various protocols like network file system (NFS) and common internet file system (CIFS) and data services for storage area network (SAN) based storage architectures.

In order to protect against disasters and to facilitate data migration from one volume to another, data in a given volume is replicated to another volume. The replication should occur in a fast and efficient manner, regardless of whether the two volumes are the same or different volume types. In one example, a storage server, such as a filer, is used to backup critical data using a technique known as "mirroring," which involves backing up data stored at a primary site by storing an exact duplicate (a mirror image) of the data at a remote secondary site. If data is ever lost at the primary site, it can be recovered from the secondary site.

One problem with conventional data migration techniques is that they may be disruptive to clients wishing to access the data. A client specifies the particular data it wishes to access using an identifier. Typically, the identifier for the data is specific to type of underlying file system. Thus, if data migration between file servers with different file systems takes place while a client is accessing the data, the client must stop working on the data and restart its read/write operation after the move operation has been completed with the correct new identifier. Conventional schemes may try to solve this problem by implementing non-disruptive move techniques. When a non-disruptive move is used, the client continues normal operation and is unaffected by the move operation. However, conventional non-disruptive data migration techniques require that the source data volume and destination data volume implement the same file system type and represent the data in the same way in order for the move to be non-disruptive.

SUMMARY OF THE INVENTION

A replication operation service migrates data from a source volume having a source file system type to a destination volume having a destination file system type, where the source file system type may be different from the destination file system type. The replication operation is completed without interrupting the operations of a client device in the system. A stable copy of the source file system is generated on the source volume. A file system agnostic representation of a portion of the data in the source volume is generated from the stable copy. The representation is transmitted to the destination volume where it is converted to conform to the destination file system type.

BRIEF DESCRIPTION OF THE DRAWINGS

The present invention is illustrated by way of example, and not by way of limitation, in the figures of the accompanying drawings.

DETAILED DESCRIPTION

In the following detailed description of embodiments of the invention, reference is made to the accompanying drawings in which like references indicate similar elements, and in which is shown by way of illustration, specific embodiments in which the invention may be practiced. These embodiments are described in sufficient detail to enable those skilled in the art to practice the invention, and it is to be understood that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

Non-disruptive data replication may operate in an environment where a source volume and a destination volume may have different file system types. For example, a file system agnostic representation of the data in the source volume is created and sent to the destination volume where it is converted into the appropriate data type for the destination file system. Uses include backing up data stored at a primary site by storing a copy of the data at a remote secondary site, making multiple parallel copies of the data for load sharing purposes so that a file server can dynamically load balance clients between various copies of the data, and migrating a volume from one location to another location having a different file system type, among other uses.

The data replication described herein offers the advantage of allowing for replication of data between potentially different file systems without disrupting the operation of a client. The file system agnostic data replication technique allows for one file system to replicate data in another file system without either file system having specific information regarding the layout of the other file system. The replication is accomplished without disrupting the actions of a client accessing data in either file system.

Figure 1:
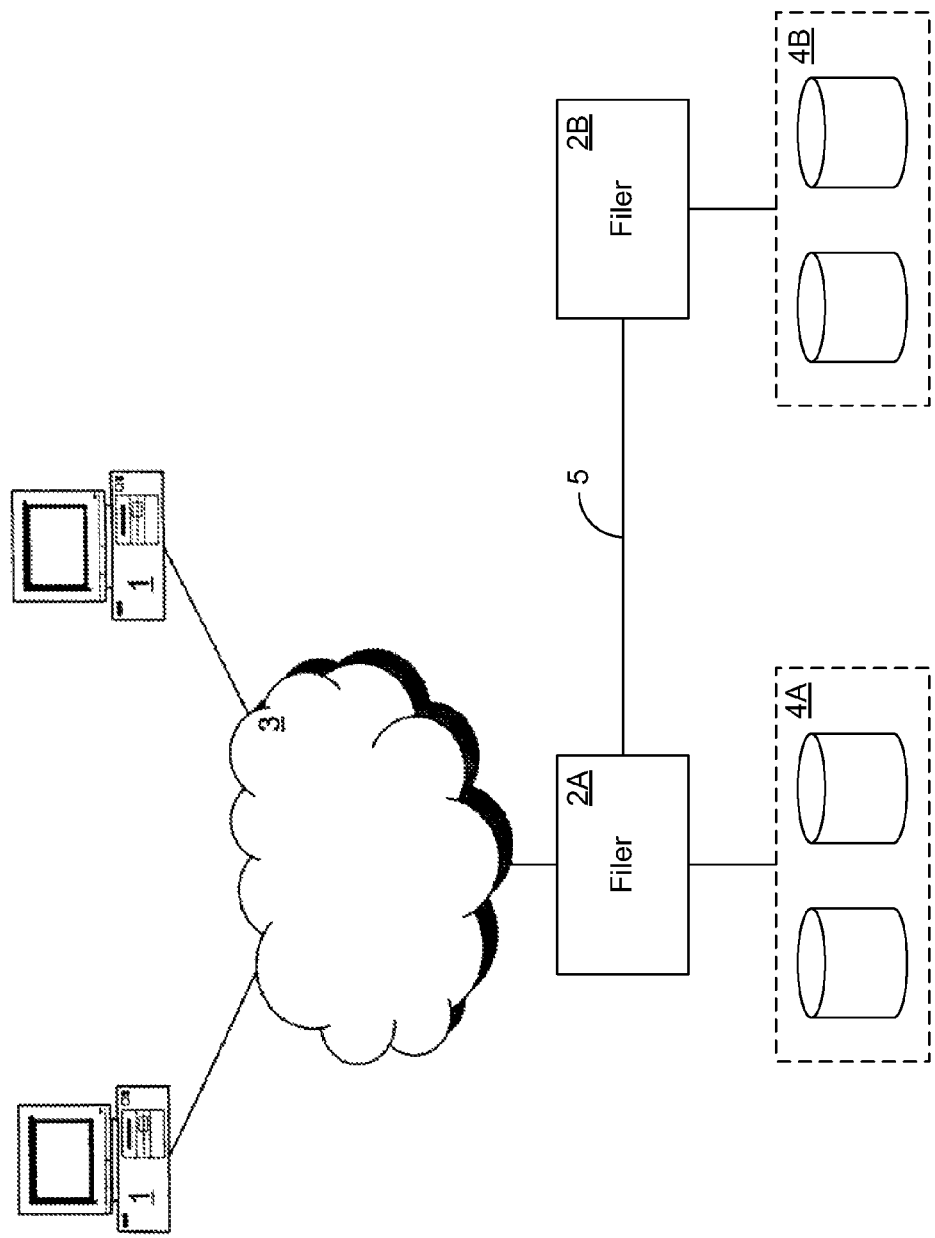
FIG. 1 is a block diagram illustrating a network configuration according to one embodiment.

FIG. 1 is a block diagram illustrating a network configuration according to one embodiment. In this embodiment, a source filer 2A, located at a primary location, is coupled locally to a set of mass storage devices 4A, to a set of clients 1 through a network 3, such as a local area network (LAN), and to a destination filer 2B, located at a remote mirror site. Each of the clients 1 may be, for example, a conventional personal computer (PC), workstation, or the like. The destination filer 2B located at the mirror site is coupled locally to a separate set of mass storage devices 4B at the mirror site. The mass storage devices 4A and 4B may be, for example, conventional magnetic disks, optical disks such as CD-ROM or DVD based storage, magneto-optical (MO) storage, or any other type of non-volatile storage devices suitable for storing large quantities of data. The source filer 2A receives and responds to various read and write requests from the clients 1. As shown, the source filer 2A and destination filer 2B are connected by an interconnect 5.

In one embodiment, mass storage device 4A has data arranged in a logical volume. In this embodiment, data is copied from the volume of mass storage device 4A into a logical volume on mass storage device 4B, as described above. In this situation, the volume of mass storage device 4A is referred to as the source volume and the volume of mass storage device 4B as the destination volume. In one embodiment, the destination volume is one of a plurality of volumes, specified by a system administrator initiating the data migration. In alternative embodiments, such as where data is copied from mass storage device 4B to mass storage device 4A, the source and destination labels may be reversed. The source volume and the destination volume may have their respective data arranged using different file system types. Thus, in one embodiment, the source volume of mass storage device 4A has a first file system type and the destination volume of mass storage device 4B has a second file system type, where the first and second file system types are different. Examples of file system types may include flexible volumes, striped volumes, traditional volumes or other volume types. In alternative embodiments, the source volume and destination volume may have the same file system type.

The filers 2A and 2B may have a distributed architecture, for example, including a separate N- ("network") blade and D- ("disk") blade (not shown). In such an embodiment, the N-blade is used to communicate with clients 1, while the D-blade includes the file system functionality and is used to communicate with the storage subsystem 4A and 4B. The N-blade and D-blade communicate with each other using an internal protocol. Alternatively, the filers 2A and 2B may have an integrated architecture, where the network and data components are all contained in a single box. The filers 2A and 2B further may be coupled through a switching fabric to other similar storage systems (not shown) which have their own local storage subsystems. In this way, all of the storage subsystems can form a single storage pool, to which any client of any of the storage systems has access.

In one embodiment, when a client 1 accesses a storage device, such as storage device 4A, the client identifies specific objects on the storage device by using an identifier. In certain embodiments, the identifier includes a filename, a NFS file handle, a CIFS file identifier, or a directory search cookie. In alternative embodiments, some other object identifier is used. When a server passes information such as a file handle or directory search cookie to a client, the server promises that when the client later passes this information back to the server, it will most likely still be valid and can be used in reconstructing the state needed to perform a requested operation.

In addition to using filenames to identify files, file handles and directory search cookies are used to identify various objects within the file system, for purposes of servicing read and write requests. The way that file handles and directory search cookies get constructed is typically very specific to the design of the underlying file system. Consequently, if the system copies files from one file system type to another, filenames are preserved, but not file handles or directory search cookies. In one embodiment of the present file system agnostic replication system, the various ways that a client may use to identify files are recorded and represented in replication operation data units. The replication operation data units are used to send the identifiers from the source file system to the destination file system. Thus, once the replication is complete, the destination file system is capable of referring to the objects in the file system using the same identifiers as the source file system, thereby preserving client access.

Figure 2:
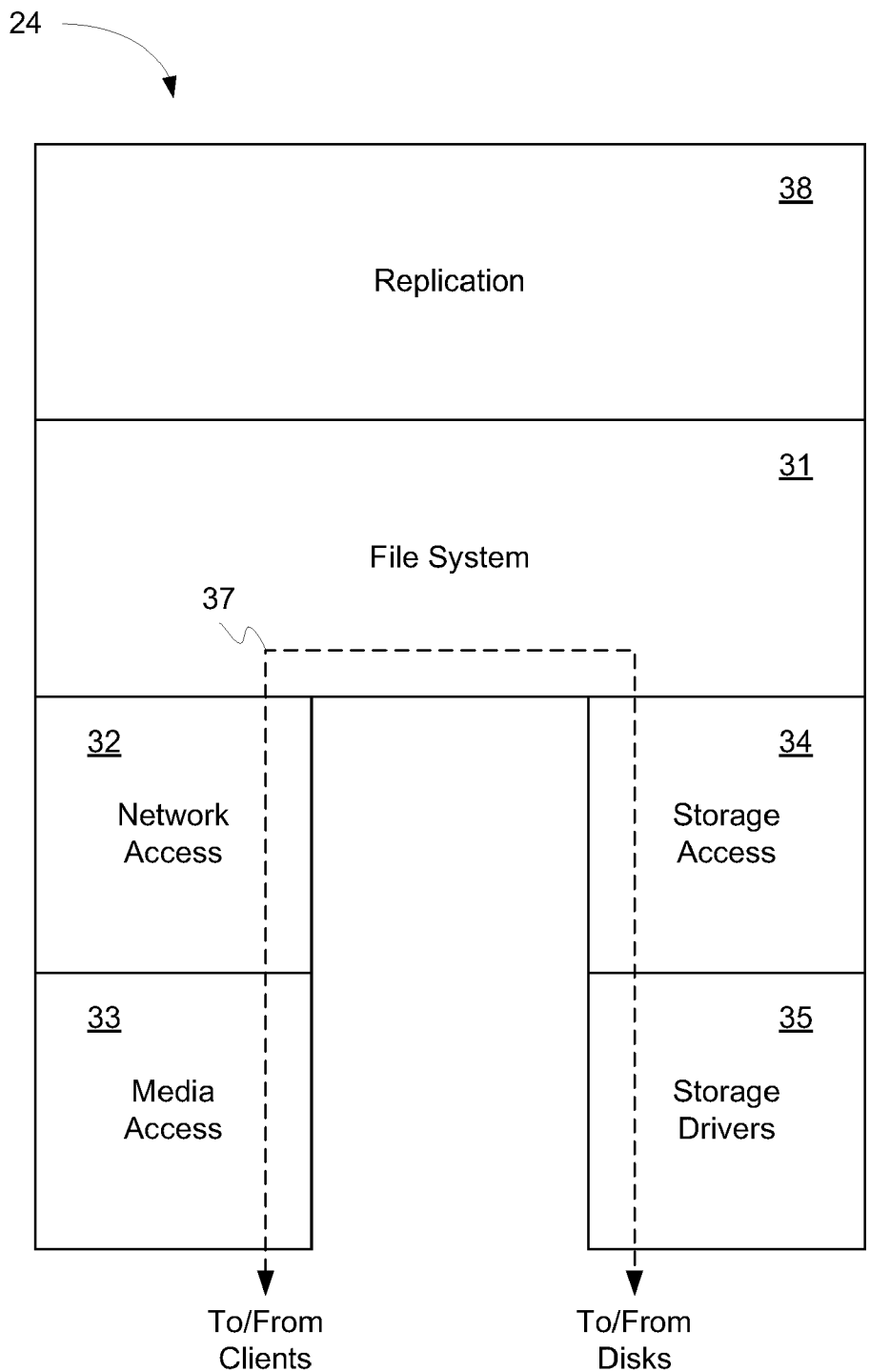
FIG. 2 is a block diagram illustrating the architecture of an operating system of a storage system according to one embodiment.

FIG. 2 shows an example of the operating system 24 of a storage server, such as storage server 2A or 2B, shown in FIG. 1. As shown, the operating system 24 includes several software modules, or "layers." These layers include a file system 31. The file system 31 is application-layer software that imposes a structure (hierarchy) on the data stored in the storage subsystem 4A or 4B and services read/write requests from clients 1. Note that the term "file system" also sometimes refers to the actual stored data or its hierarchical structure; the particular meaning in any given instance will be readily apparent to those skilled in the relevant art, from context.

The operating system 24 also includes a network access layer 32 and an associated media access layer 33, to allow the file server to communicate over the network 3 (e.g., with clients 1). The network access layer 32 implements one or more of various higher-level network protocols, such as Network File System (NFS), Common Internet File System (CIFS), Hypertext Transfer Protocol (HTTP) and/or Transmission Control Protocol/Internet Protocol (TCP/IP). The media access layer 33 includes one or more drivers which implement one or more lower-level protocols to communicate over the network, such as Ethernet.

The operating system 24 also includes a storage access layer 34 and an associated storage driver layer 35, to allow the file server to communicate with the storage subsystem. The storage access layer 34 implements a higher-level disk storage protocol, such as RAID, while the storage driver layer 35 implements a lower-level storage device access protocol, such as Fibre Channel Protocol (FCP) or small computer system interface (SCSI). Also shown in FIG. 2 is the path 37 of data flow, through the operating system 24, associated with a read or write operation.

In certain embodiments, as illustrated in FIG. 2, the operating system 24 further includes a replication layer 38, to implement a file system agnostic data replication service in conjunction with another storage server. The other storage server may control access to a destination volume, where data from the source volume may be replicated. In one embodiment, the destination storage server includes an operating system similar to operating system 24.

The replication layer 38 of operating system 24 is used to generate replication operation data units, representing the data to be replicated, which are used to perform file system agnostic data replication, as will be discussed below. The replication operation data units represent the data to be replicated in a file system agnostic format. The replication operation data units are used by a destination file system to recreate the data replicated from a source volume on the destination volume in the format appropriate for the destination volume file system. The destination storage server does not need any information about the source file system in order to recreate the data from the replication operation data units.

Figure 3:
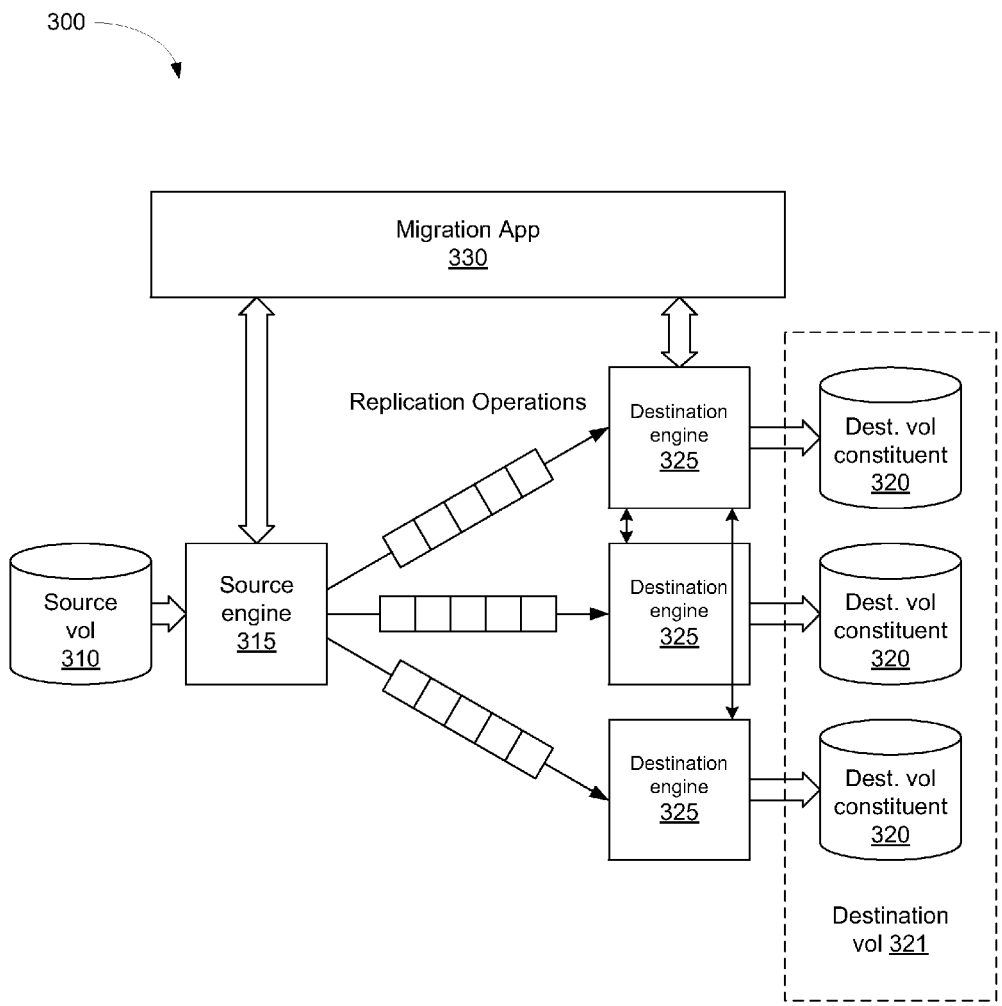
FIG. 3 is a block diagram illustrating a file system agnostic data replication system, according to one embodiment.

FIG. 3 is a block diagram illustrating a file system agnostic data replication service, implemented in replication layer 38 of FIG. 2, according to one embodiment. In one embodiment, the service 300 includes a source volume 310 and a destination volume 321. In one embodiment, source volume 310 is a volume on a mass storage device, such as mass storage device 4A of FIG. 1, and destination volume 321 is a volume on a mass storage device, such as mass storage device 4B of FIG. 1. In this embodiment the source volume 310 is a flexible volume and the destination volume 321 is a striped volume comprised of several constituent volumes 320. In a flexible volume, the file system layout flexibly allocates an underlying physical volume into one or more virtual volumes of the storage system. To that extent, the sizing of flexible volumes is flexible, which avoids partitioning of storage space and any resulting problems. In a striped volume, data is stored at various offsets in an underlying volume, where each offset forms a stripe, or constituent volume. However, in alternative embodiments, the source and destination may have other volume types and those volume types may be different from one another. In other alternative embodiments the data to be migrated may be arranged in data sets other than volumes. For example, data may be arranged as a logical unit number (LUN). A LUN is a logical data container (i.e., another type of logical storage container). A LUN may appear to a user as a physical storage device, such as a disk.

Service 300 further includes source engine 315 and destination engines 325. Source engine 315 and destination engines 325 are responsible for retrieving the data to be replicated, converting the data into a file system agnostic representation, transmitting and receiving the data, converting the data to the appropriate file system type and writing the data in a location on a volume. In one embodiment, source engine 315 and destination engines 325 are each located in a filer, such as Filers 2A and 2B of FIG. 1, respectively.

In one embodiment, the service running on a storage server, such as storage server 2A of FIG. 1, reads data from the source volume 310, creates logical units, called replication operation data units, to represent the data read from the source volume in a file system agnostic format, and delivers the replication operation data units to the destination volume 320 for processing. The file system for the source volume 310 is accessed by a source side of the service and provides data from which replication operation data units are generated. On the destination side, the destination file system receives replication operation data units, converts them into file system specific data units according to the destination file system and writes the data to the volume on disk.

Each file system may export a set of rules for collecting information from a location in the associated volume and delivering data to a location on the associated volume depending on the type of file system. Using the rules for each file system, the service is capable of efficiently gathering data, aggregating the data and routing data (possibly over a network) to a location on the destination volume based on the rules provided by the destination file system. In one embodiment, the file system may be a Write Anywhere File-system Layout (WAFL), which is described in U.S. Pat. No. 5,819, 292 owned by NetApp, Inc.

For the purposes of replication, in one embodiment, a unit of data or object in a file system is expressed in replication operation data units including an identifier for the object and file data. In one embodiment, the file data includes (1) the metadata information, which may include an inode number and other attributes of the data, (2) a data block within the unit of data, and/or (3) a directory entry of a directory or a similar logical construct. Furthermore, the replication operation data units are idempotent, such that multiple instances of the replication operation data units for the same underlying source data will be the same and their multiple invocations at the destination have the same effect as one invocation. The file systems on each end of the data replication service accept these logical units of data in any order so that the transmission will be efficient and any deadlock conditions that may come with ordering of such data units are eliminated. In one embodiment, the destination file system starts in an initial state which is known to the source. The source sends a stream of replication operation data units to transform the destination file system from the initial state to a new state. The state of the destination file system may be inconsistent in the middle of the stream, but the entire stream, taken in its entirety will bring the destination file system to a consistent state.

As an example, data may be gathered from a flexible volume 310 by comparing two point-in-time snapshots of the data set. From the comparison, a difference between the two snapshots is determined. The results of the comparison are sent to a striped volume 320 without the flexible volume 310 having information regarding the destination of the data or the striped volume knowing the source of the data. The service creates replication operation data units to represent all the data to be replicated, makes routing decisions based on the rules provided by the destination volume, and delivers the data to a particular constituent of the striped volume for processing. During processing of the replication operation data units, the destination file system may well be logically inconsistent. However, once the transfer has finished, the destination file system will not be inconsistent. Migration App 330 is the application which chooses to make use of logical replication to accomplish a task, such as, for example, making a copy of a volume or migrating a volume from one location to another. The application may make policy decisions regarding which snapshots to transfer, but whether the transfer is incremental or baseline, the replication operation data units are used.

Figure 4:
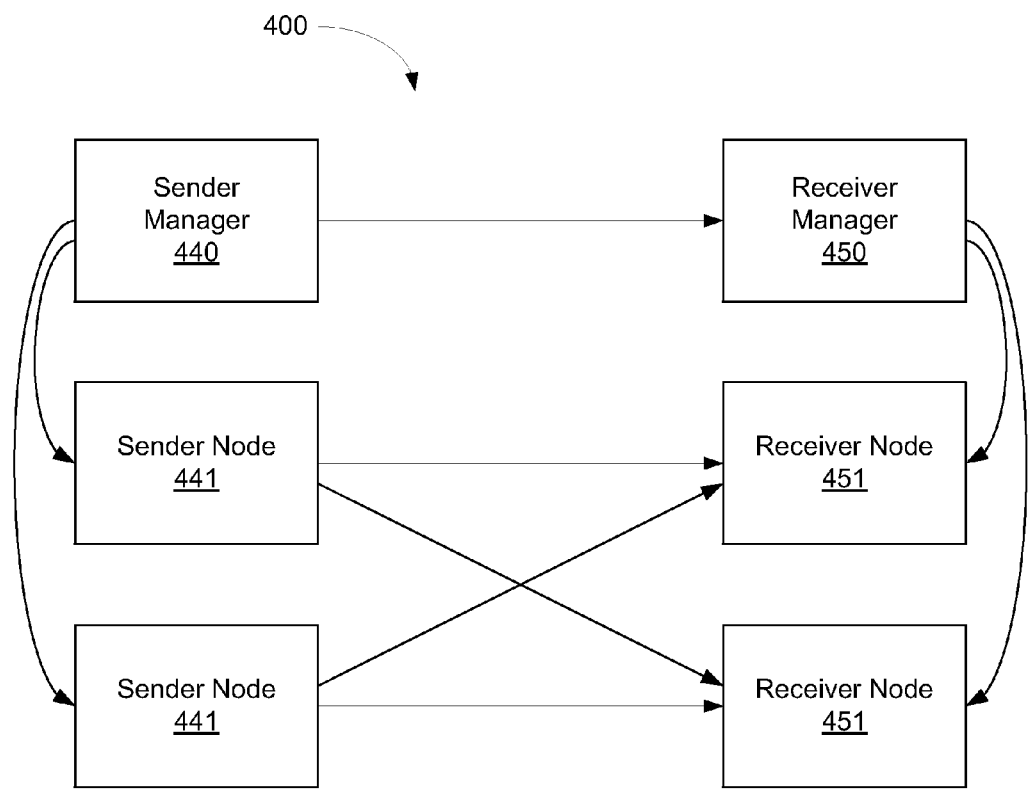
FIG. 4 is a block diagram illustrating a file system agnostic data replication system, according to one embodiment.

FIG. 4 is a block diagram illustrating components of a file system agnostic data replication service, such as service 300 of FIG. 3, according to one embodiment. In this embodiment, the service 400 includes a sender manager 440 communicating with a receiver manager 450 to setup a file-system agnostic transfer of data. The sender manager 440 creates agents, called sender nodes 441 on a file server where a volume or constituents of the volume are present. In one embodiment the sender nodes 441 are created in the source engine 315 of FIG. 3. Correspondingly, the receiver manager 450 creates receiver nodes 451 as required, for example, in the destination engine 325 of FIG. 3. In this embodiment, each of the sender nodes 441 is linked to all of the receiver nodes 451 so that the replication operation data units may be routed to any part of the destination volume as needed. In alternative embodiments, the sender nodes and receiver nodes may be linked in a different fashion.

Figure 5A:
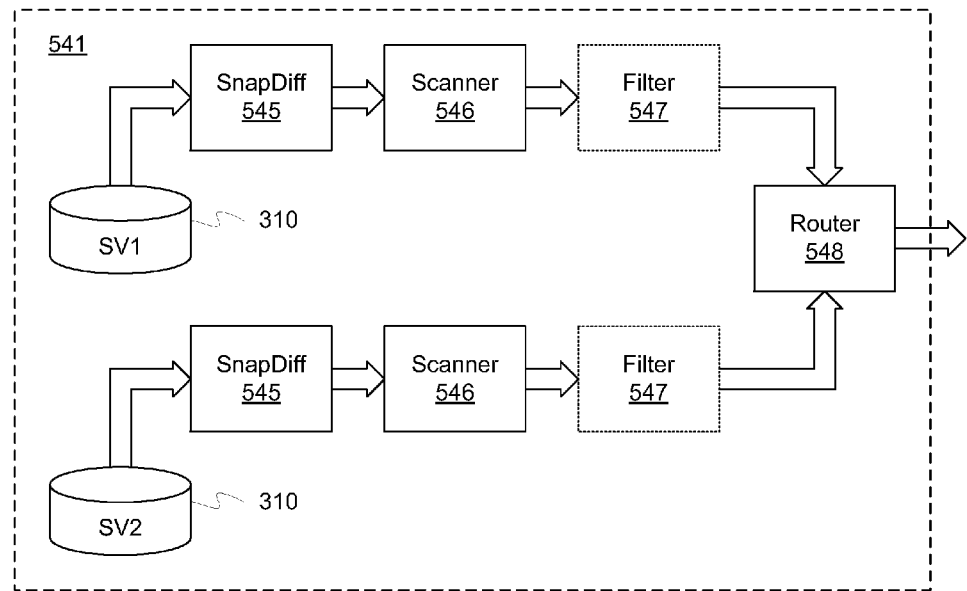
FIG. 5A is a block diagram illustrating a sender node, according to one embodiment.

FIG. 5A is a block diagram illustrating a sender node 541, such as sender node 441 of FIG. 4, according to one embodiment. Sender node 541 includes a snapshot comparison module called SnapDiff 545. A stable file system (i.e., one that is not in the process of being altered through either a read or write operation) is used to generate the replication operation data units. The source and destination volumes each have a specific, stable file system which represents the same set of information. This specific, stable file system is known as the common snapshot. A "snapshot" is a persistent image of the exact state of the data maintained by the storage server 2 (or a designated subset thereof) at a given point in time, from which that state can be restored if necessary (e.g., in the event of a catastrophic loss of data). The common snapshot is represented in a manner specific to the formats of the individual volumes. Thus, the representation on the source may differ from the representation on the destination. In the case of a baseline transfer, the common snapshot may be a notional snapshot of an "empty" file system. A stable version of the source file system is created by taking a snapshot of the source volume. The information to be transferred is determined by calculating the difference between the new source snapshot and the common snapshot. The comparison identifies differences in individual data blocks between the two datasets (i.e., snapshots), by comparing corresponding blocks between the two datasets to determine if any blocks have been added or deleted and whether the metadata has been modified. After SnapDiff module 545 performs this snapshot comparison, it sends the differences to scanner module 546. Note, however, that in alternative embodiments, the technique introduced herein can be used to compare and characterize the differences between datasets other than snapshots or different versions of a given set of data.

Scanner 546 is a file system specific scanner module which constructs replication operation data units. Scanner 546 receives the file system differences from SnapDiff module 545, which represent the data to be replicated from source volume 310. Scanner 546 constructs a number of replication operation data units that represent the changes to each file. There may be separate replication operation data units for the metadata information, the data block, the directory entry, etc. as discussed above. The replication operation data units are file system agnostic units of data and replicate data between two or more volumes that may have data arranged in different file system types. Scanner 546 receives the data from source volume 310 in the source volume file system format, and translates that data into the file system agnostic replication operation data units. The replication operation data units are optionally passed through a filter 547, where certain operations are dropped before transmission to the destination file server.

Sender node 541 further includes router module 548. Router 548 is responsible for transmitting the replication operation data units to the destination volume. Router 548 receives the replication operation data units to be sent, and determines how to send them to the destination, possibly routing them to an individual constituent of the destination volume. Different geometries for the source volume and destination volumes mean data may be arranged differently on each, and a particular piece of data may be stored at a different location on the destination volume than it was on the source volume. Router 548 consults routing information provided by the destination volume to make this determination. As illustrated above in FIG. 4, each sender node is coupled to each receiver node on the destination file server. Thus, replication operation data units may be transmitted by router 548 to a location anywhere on the destination volume. In alternative embodiments, there may be one router that services all sender nodes on the source file server.

Figure 5B:
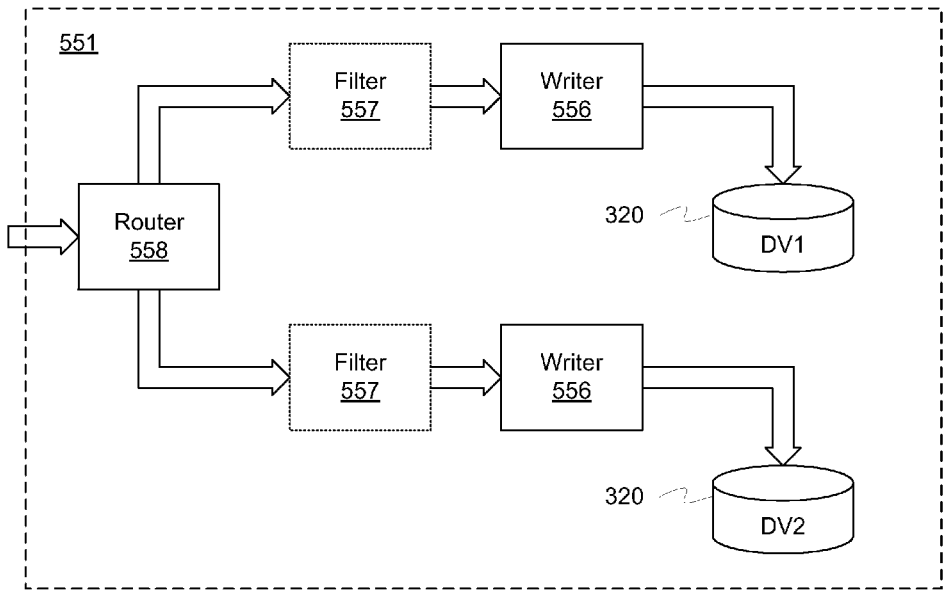
FIG. 5B is a block diagram illustrating a receiver node, according to one embodiment.

FIG. 5B is a block diagram illustrating a receiver node 551, such as receiver node 451, according to one embodiment. Receiver node 551 includes a router module 558 that receives the transmitted replication operation data unit from sender node 541. Receiver node 551 may have its own set of routing rules to determine which volume 320 the data should be stored on. Router 558 makes that determination and sends the data along the appropriate path. In alternative embodiments, there is one router that services all receiver nodes on the destination.

The received replication operation data unit is optionally routed to a filter 557 and on to a file system specific writer module 556. The filter 557 makes a determination of whether the received replication operation data unit is actually needed by the destination. If not (i.e., in a case, where that particular data has already been updated), the replication operation data unit is dropped. Writer 556 receives the file system agnostic replication operation data unit and converts the data to the proper format for the destination file system. Converting the data in the received replication operation allows the service to reconstruct the original data from the source file server according to the destination file system type. The reconstructed data is then written into destination volume 320.

It is important to note that the neither the source file server nor the destination file server has information regarding the file system type of the other. The service only has information regarding the rules of data layout on the source volume for collecting data, and rules of data layout on the destination volume for delivering data. The source and destination file servers act in isolation to each other to either generate replication operation data units from a native format or to convert replication operation data units into a native format.

Figure 6:
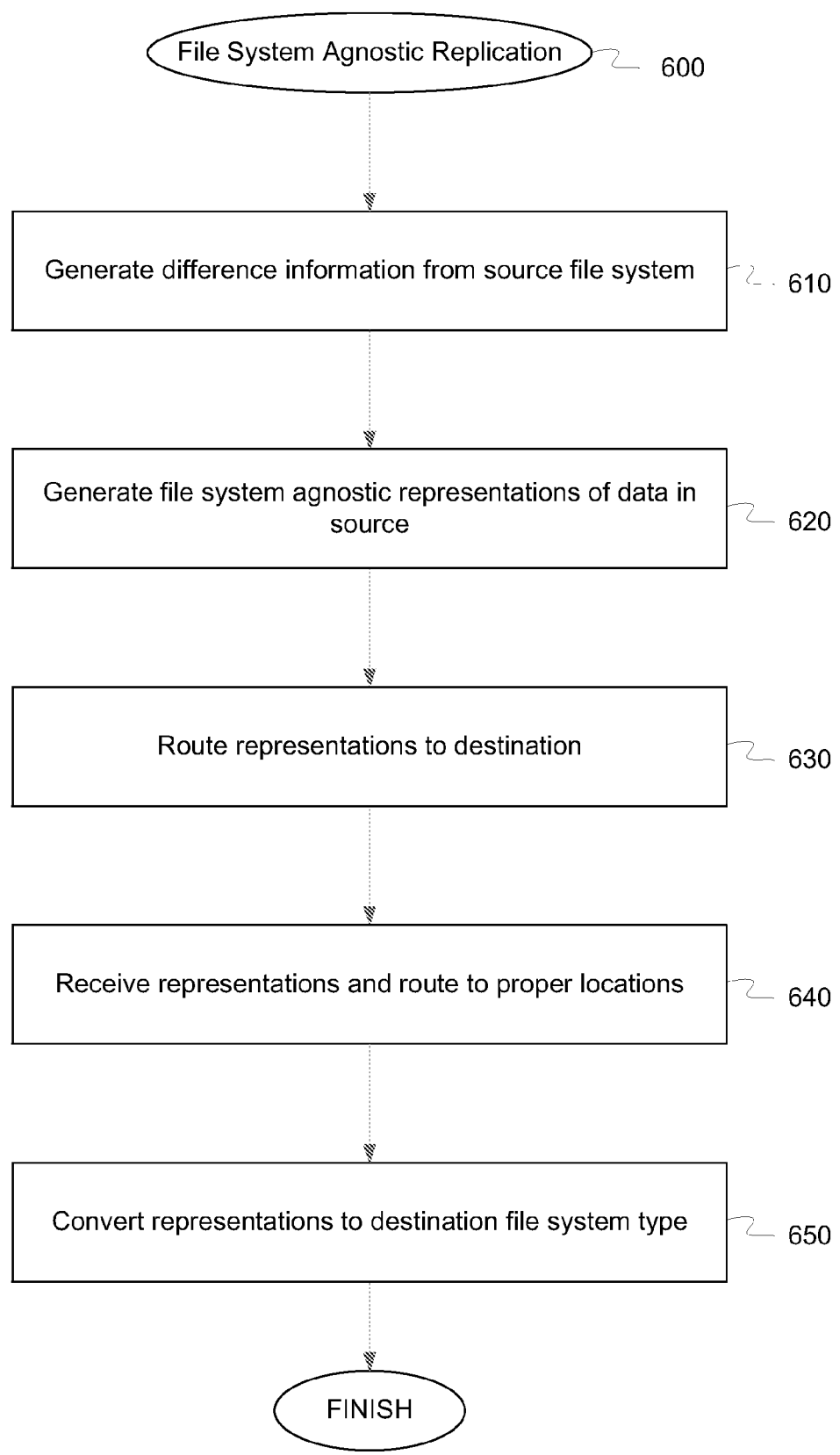
FIG. 6 is a flow diagram illustrating a file system agnostic data replication process according to one embodiment.

FIG. 6 is a flow diagram illustrating a file system agnostic data replication process according to one embodiment. The process 600 may be performed by processing logic that comprises hardware (e.g., circuitry, dedicated logic, programmable logic, microcode, etc.), software (e.g., instructions run on a processing device to perform hardware simulation), or a combination thereof. In one embodiment, process 600 is performed by sender node 541 and receiver node 551 of FIGS. 5A and 5B. In one embodiment, at block 610, process 600 generates difference information from the source file system. The difference information may be generated by SnapDiff module 545 of FIG. 5A by comparing two snapshots of the source file system. At block 620, process 600 generates a file system agnostic representation of the source data. In one embodiment, the file system agnostic representation is a replication operation data unit generated by scanner module 546 of FIG. 5A. At block 630, process 600 routes the replication operation data unit to the appropriate location on the destination volume. The routing may be performed by router 548 of FIG. 5A.

At block 640, process 600 receives the replication operation data unit and routes it down a particular path in the destination as described with respect to router 558 of FIG. 5B. At block 650, process 600 converts the replication operation data unit to the proper format for the destination file system. In one embodiment, writer module 556 of FIG. 5B converts the data to the proper format. Thus, the original data from the source file server is reconstructed according to the destination file system type. Once the data is converted to the proper format, the reconstructed data is written to disk in the destination and process 600 ends.

Figure 7:
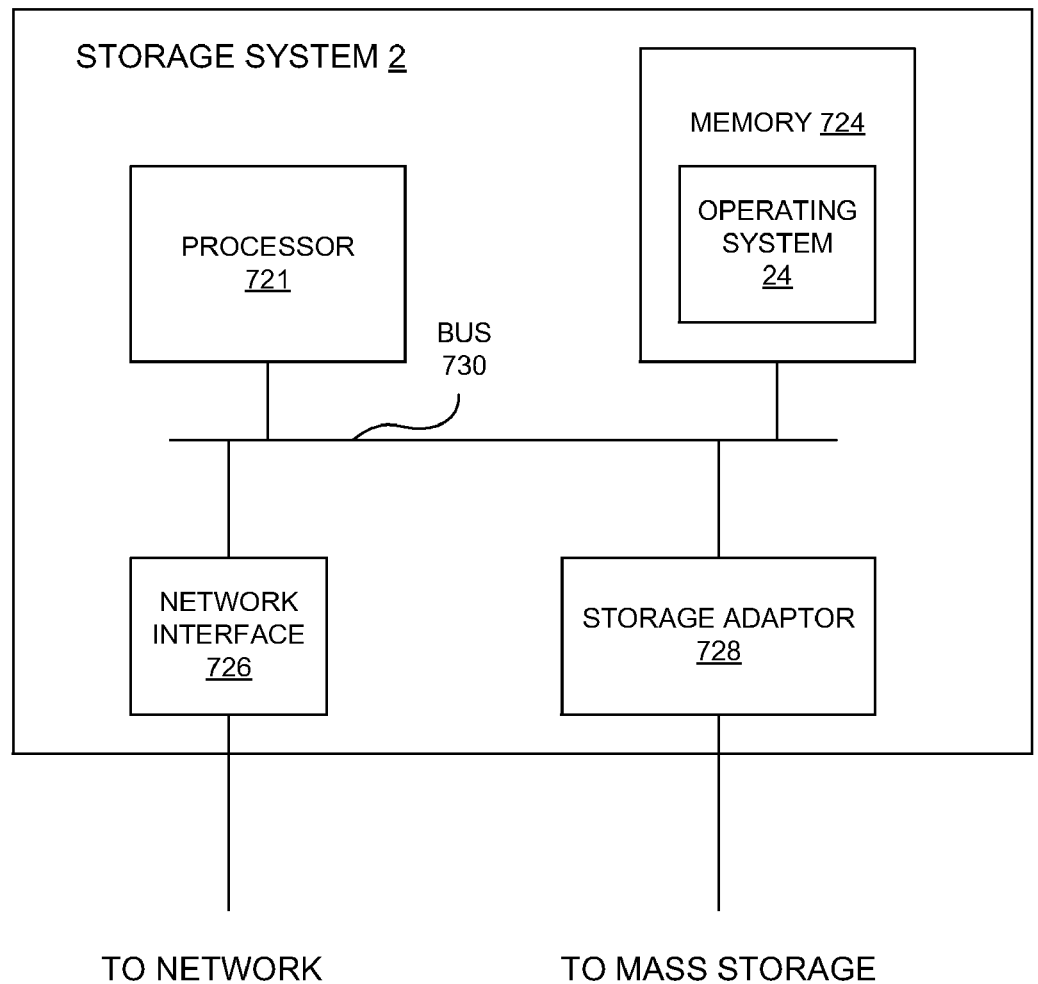
FIG. 7 illustrates a block diagram of one embodiment of the hardware architecture of a storage system.

FIG. 7 illustrates a schematic block diagram of one embodiment of a storage system 2 which may implement the above-described schemes, according to certain embodiments of the invention. Referring to FIG. 7, in this embodiment, the storage system 2 includes a processor 721, a memory 724, a network interface 726, and a storage adaptor 728, which are coupled to each other via a bus system 730. The bus system 730 may include one or more busses and/or interconnects. The storage system 2 communicates with a network via the network interface 726, which may be an Ethernet adaptor, fiber channel adaptor, etc. The network interface 726 may be coupled to a public network, a private network, or a combination of both in order to communicate with a client machine usable by an administrator of the remote data storage system.

In one embodiment, the processor 721 reads instructions from the memory 724 and executes the instructions. The memory 724 may include any of various types of memory devices, such as, for example, random access memory (RAM), read-only memory (ROM), flash memory, one or more mass storage devices (e.g., disks), etc. The memory 724 stores instructions of an operating system 24. The processor 721 retrieves the instructions from the memory 724 to run the operating system 24. The storage system 2 interfaces with one or more storage systems via the storage adaptor 728, which may include a small computer system interface (SCSI) adaptor, fiber channel adaptor, etc.

The above description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Embodiments of the present invention include various operations, which are described above. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a machine-readable medium. These instructions may be used to program a general-purpose or special-purpose processor to perform the described operations. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Additionally, some embodiments may be practiced in distributed computing environments where the machine-readable medium is stored on and/or executed by more than one computer system. In addition, the information transferred between computer systems may either be pulled or pushed across the communication medium connecting the computer systems.

The digital processing devices described herein may include one or more general-purpose processing devices such as a microprocessor or central processing unit, a controller, or the like. Alternatively, the digital processing device may include one or more special-purpose processing devices such as a digital signal processor (DSP), an application specific integrated circuit (ASIC), a field programmable gate array (FPGA), or the like. In an alternative embodiment, for example, the digital processing device may be a network processor having multiple processors including a core unit and multiple microengines. Additionally, the digital processing device may include any combination of general-purpose processing devices and special-purpose processing device(s).

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the above descriptions, embodiments have been described in terms of objects in an object-oriented environment. It should be understood, that the invention is not limited to embodiments in object-oriented environments and that alternative embodiments may be implemented in other programming environments having characteristics similar to object-oriented concepts.

In the foregoing specification, the invention has been described with reference to specific exemplary embodiments thereof. It will, however, be evident that various modifications and changes may be made thereto without departing from the broader scope of the invention as set forth in the appended claims. The specification and drawings are, accordingly, to be regarded in an illustrative sense rather than a restrictive sense.

What is claimed is:

1. A method comprising:
    migrating data from a source volume having a source file system type on a first storage system to a destination volume having a destination file system type on a second storage system, wherein the source file system type is different from the destination file system type, and wherein the source volume comprises an object, identified by an identifier, configured to be accessed by a client device;
    generating, by the first storage system, difference information from a source file system on the source volume;
    generating, by the first storage system, a file system agnostic representation of the object in the source volume from the difference information, wherein the representation comprises the identifier and file data;
    transmitting, by the first storage system, the representation to the destination volume having the destination file system type; and
    converting, by the second storage system, the representation to conform to the destination file system type, wherein the converted representation always comprises the same identifier and the same file data from the source file system.

2. The method of claim 1, wherein the file data comprises metadata information, a data block, or a directory entry.

3. The method of claim 1, wherein the identifier comprises one of a common Internet file system (CIFS) file identifier; a network file system (NFS) file handle; a directory search cookie; and a filename.

4. The method of claim 1, wherein generating difference information comprises:
    creating a first snapshot of the source file system;
    creating a second snapshot of the source file system; and determining a difference between the first snapshot and the second snapshot.

5. The method of claim 1, wherein generating a the system agnostic representation comprises:
   reading a portion of data from the difference information;
   extracting metadata information, a data block and a directory entry for the portion of the data; and
   converting the metadata information, the data block and the directory entry into a file system agnostic format.

6. The method of claim 1, wherein converting the representation comprises reconstructing the object from the representation according to the destination file system type.

7. A system comprising:
   a client device;
   a first storage system coupled to the client device; and
   a second storage system coupled to the first storage system, wherein the first storage system is configured to migrate data from a source volume having a source file system type on the first storage system to a destination volume having a destination file system type on the second storage system, wherein the source file system type is different from the destination file system type, wherein the source volume comprises an object, identified by an identifier, configured to be accessed by the client device, wherein the first storage system is configured to:
      generate difference information from a source file system on the source volume;
      generate a file system agnostic representation of the object in the source volume from the difference information, wherein the representation comprises the identifier and file data; and
      transmit the representation to the destination volume; and
   wherein the second storage system is configured to:
      convert the representation to conform to the destination file system type, wherein converted representation always comprises the same identifier and the same file data from the source file system; and
      identify the object using the identifier.

8. The system of claim 7, wherein the file data comprises metadata information, a data block, or a directory entry.

9. The system of claim 7, wherein the identifier comprises one of a common internet file system (CIFS) file identifier; network file system (NFS) file handle; a directory search cookie; and a filename.

10. The system of claim 7, wherein the first storage server comprises a sender node and the second storage server comprises a receiver node.

11. The system of claim 10, wherein the sender node comprises:
   a snapshot comparison module;
   a scanner module coupled to the snapshot comparison module; and
   a router coupled to the scanner module.

12. The system of claim 11, wherein the scanner module is configured to generate a file system agnostic representation of a portion of data in the source volume.

13. The system of claim 10, wherein the receiver node comprises:
   a router; and
   a writer module coupled to the router.

14. The system of claim 13, wherein the writer module is configured to convert the file system agnostic representation to conform to the destination file system type.

15. The system of claim 14, wherein converting the file system agnostic representation comprises reconstructing the object from the representation according to the destination file system type.

16. The system of claim 14, wherein the sender node further comprises a filter module coupled to the scanner module.

17. The system of claim 16, wherein the receiver node further comprises a filter module coupled to the router.

18. The system of claim 7, wherein generating a file system agnostic representation comprises:
   reading a portion of the data from the snapshot comparison module;
   extracting metadata information, a data block and a directory entry for the portion of the data; and
   converting the metadata information, the data block and the directory entry into a file system agnostic format.

19. A machine readable non-transitory storage medium storing executable program instructions which when executed by a data processing system cause the data processing system to perform a method comprising:
   migrating data from a source volume having a source file system type on a first storage system to a destination volume having a destination file system type on a second storage system, wherein the source file system type is different from the destination the system type, and wherein the source volume comprises an object, identified by an identifier, configured to be accessed by a client device
   generating, by the first storage system, difference information from a source file system on the source volume;
   generating, by the first storage system, a file system agnostic representation of the object in the source volume from the difference information, wherein the representation comprises the identifier and file data;
   transmitting, by the first storage system, the representation to the destination volume having the destination file system type; and
   converting, by the second storage system, the representation to conform to the destination file system type, wherein the converted representation always comprises the same identifier and the same file data from the source file system.

20. The medium as in claim 19, wherein the file data comprises metadata information, a data block, or a directory entry.

21. The medium as in claim 19, wherein the identifier comprises one of: a common internet file system (CIFS) file identifier; a network file system (NFS) file handle; a directory search cookie; and a filename.

22. The medium as in claim 19, wherein generating difference information comprises:
   creating a first snapshot of the source file system;
   creating a second snapshot of the source file system; and
   determining a difference between the first snapshot and the second snapshot.

23. The medium as in claim 19, wherein generating a file system agnostic representation comprises:
   reading a portion of data from the difference information;
   extracting metadata information, a data block and a directory entry for the portion of the data; and
   converting the metadata information, the data block and the directory entry into a file system agnostic format.

24. The medium as in claim 19, wherein converting the representation comprises reconstructing the object from the representation according to the destination file system type.

* * * * *